US012780232B2

(12) United States Patent
Takahashi

(10) Patent No.: US 12,780,232 B2
(45) Date of Patent: Nov. 3, 2026

(54) VEHICLE WARNING APPARATUS

(71) Applicant: SUBARU CORPORATION, Tokyo (JP)

(72) Inventor: Tetsuya Takahashi, Tokyo (JP)

(73) Assignee: Subaru Corporation, Tokyo (JP)

( * ) Notice: Subject to any disclaimer, the term of this patent is extended or adjusted under 35 U.S.C. 154(b) by 47 days.

(21) Appl. No.: 18/377,699

(22) Filed: Oct. 6, 2023

(65) Prior Publication Data

US 2024/0174248 A1 May 30, 2024

(30) Foreign Application Priority Data

Nov. 24, 2022 (JP) ................................ 2022-187383

(51) Int. Cl.
*B60W 50/14* (2020.01)
*B60W 40/08* (2012.01)
*G06V 20/59* (2022.01)

(52) U.S. Cl.
CPC ............ *B60W 50/14* (2013.01); *B60W 40/08* (2013.01); *G06V 20/597* (2022.01); *B60W 2050/146* (2013.01); *B60W 2540/229* (2020.02)

(58) Field of Classification Search
CPC ................. B60W 50/14; B60W 40/08; B60W 2540/229; B60W 2050/146; G06V 20/597
USPC ........................................................ 340/425.5
See application file for complete search history.

(56) References Cited

U.S. PATENT DOCUMENTS

| | | | | |
|---|---|---|---|---|
| 9,758,176 | B2 * | 9/2017 | Mizutani | B60W 50/14 |
| 2009/0082951 | A1 * | 3/2009 | Graessley | G01C 21/3602 701/532 |
| 2010/0062788 | A1 * | 3/2010 | Nagorniak | H04W 48/04 455/456.1 |
| 2013/0150004 | A1 * | 6/2013 | Rosen | H04M 3/42357 455/418 |
| 2015/0054639 | A1 * | 2/2015 | Rosen | H04W 4/80 340/439 |
| 2015/0172450 | A1 * | 6/2015 | Singhal | G10L 15/26 455/419 |
| 2017/0303185 | A1 * | 10/2017 | Nathan | H04M 1/72463 |
| 2018/0288232 | A1 * | 10/2018 | Macneille | H04W 4/026 |

(Continued)

FOREIGN PATENT DOCUMENTS

| | | |
|---|---|---|
| JP | 2017-111508 A | 6/2017 |
| JP | 2018-156539 A | 10/2018 |

*Primary Examiner* — Naomi J Small
(74) *Attorney, Agent, or Firm* — McGinn IP Law Group, PLLC

(57) ABSTRACT

A vehicle warning apparatus includes a line-of-sight information acquisition unit, a movement information acquisition unit, a screen information acquisition unit, a warning level determination unit, and a warning unit. The warning level determination unit determines a state of the driver and a state of use of the mobile device by the driver based on line-of-sight information including a direction of a line of sight of a driver, movement information indicating a movement of a particular part of the driver, and screen information indicating a state of a screen of the mobile device, and determines a warning level based on a result of the determination. The warning unit gives a warning based on the warning level that is stronger as the warning level is higher. The warning level determination unit decreases the warning level when a function of the mobile device in use is an allowed function.

20 Claims, 10 Drawing Sheets

(56) References Cited

U.S. PATENT DOCUMENTS

| | | | | |
|---|---|---|---|---|
| 2019/0132395 | A1* | 5/2019 | Hopkins | B60K 35/10 |
| 2019/0182749 | A1* | 6/2019 | Breaux | G06F 3/0227 |
| 2020/0149893 | A1* | 5/2020 | Xu | G01C 21/28 |
| 2020/0349666 | A1* | 11/2020 | Hodge | G01C 21/3438 |
| 2021/0197863 | A1* | 7/2021 | Hotta | B60K 35/22 |
| 2026/0014991 | A1* | 1/2026 | Nakahashi | B60W 30/18072 |

* cited by examiner

| OCCUPANT MONITORING ECU | IN-VEHICLE CAMERA ECU | | WARNING LEVEL |
|---|---|---|---|
| LINE-OF-SIGHT INFORMATION | SCREEN INFORMATION | MOVEMENT INFORMATION | |
| LOOKING AT FRONT = NOT LOOKING AWAY | DARK SCREEN | MOVEMENT IS ABSENT | 0 |
| | | MOVEMENT IS PRESENT | 0.5 |
| | DIM SCREEN | MOVEMENT IS ABSENT | 0.5 |
| | | MOVEMENT IS PRESENT | 1 |
| | BRIGHT | MOVEMENT IS ABSENT | 1.5 |
| | | MOVEMENT IS PRESENT | 2 |
| NOT LOOKING AT FRONT = LOOKING AWAY | DARK SCREEN | MOVEMENT IS ABSENT | 2.5 |
| | | MOVEMENT IS PRESENT | 3 |
| | DIM SCREEN | MOVEMENT IS ABSENT | 3 |
| | | MOVEMENT IS PRESENT | 3 |
| | BRIGHT | MOVEMENT IS ABSENT | 3 |
| | | MOVEMENT IS PRESENT | 3 |

FIG. 5

| OCCUPANT MONITORING ECU | | IN-VEHICLE CAMERA ECU | | | |
|---|---|---|---|---|---|
| LINE-OF-SIGHT INFORMATION | | SCREEN INFORMATION | | MOVEMENT INFOR-MATION | WARNING LEVEL |
| | | POSITION OF SCREEN (SHIFT IN COORDINATES) | DISPLAYED CONTENT | | |
| LOOKING AT FRONT = NOT LOOKING AWAY | GLANCING AT SCREEN OF MOBILE DEVICE | ALWAYS FIXED | NAVIGATION SCREEN | MOVEMENT IS ABSENT | 0 |
| | | ALWAYS FIXED | NAVIGATION SCREEN | MOVEMENT IS PRESENT | 0.5 |
| | | UNFIXED (HOLDING WITH HAND) | NAVIGATION SCREEN | MOVEMENT IS PRESENT | 0.5 |
| NOT LOOKING AT FRONT =LOOKING AWAY | GLANCING AT SCREEN OF MOBILE DEVICE | ALWAYS FIXED | NAVIGATION SCREEN | MOVEMENT IS ABSENT | 2.5 |
| | | ALWAYS FIXED | NAVIGATION SCREEN | MOVEMENT IS PRESENT | 3 |
| | | UNFIXED (HOLDING WITH HAND) | NAVIGATION SCREEN | MOVEMENT IS PRESENT | 3 |

FIG. 6

| WARNING LEVEL | WARNING MESSAGE EXAMPLE |
|---|---|
| 0 | (NO WARNING) |
| 0.5 | YOU ARE DISTRACTED. PLEASE BE AWARE THAT YOU ARE DRIVING. |
| 1 | YOU ARE DISTRACTED. PLEASE STOP OPERATING THE MOBILE DEVICE AND BE AWARE THAT YOU ARE DRIVING. |
| 1.5 | YOU ARE FREQUENTLY LOOKING AWAY. PLEASE FOCUS ON DRIVING. |
| 2 | PLEASE STOP OPERATING THE MOBILE DEVICE AND FOCUS ON DRIVING. |
| 2.5 | IT'S DANGEROUS. PLEASE STOP LOOKING AWAY AND FOCUS ON DRIVING. |
| 3 | IT'S DANGEROUS. PLEASE STOP OPERATING THE MOBILE DEVICE IMMEDIATELY AND FOCUS ON DRIVING. |

FIG. 7

VEHICLE WARNING APPARATUS

CROSS-REFERENCE TO RELATED APPLICATIONS

The present application claims priority from Japanese Patent Application No. 2022-187383 filed on Nov. 24, 2022, the entire contents of which are hereby incorporated by reference.

BACKGROUND

The disclosure relates to a vehicle warning apparatus.

Widespread use of a mobile device such as a smartphone or a tablet terminal has led to an increase in number of cases in which a driver stares at or operates the mobile device while the vehicle is traveling. Such behavior of the driver can lead to a vehicle accident. Therefore, a technique to limit behavior of the driver, such as operating the mobile device, is proposed.

For example, Japanese Unexamined Patent Application Publication (JP-A) No. 2017-111508 discloses an information processing apparatus configured to determine whether a driver is operating a device such as a smartphone based on position information related to a particular part of the driver and a difference in light reflectance in the vicinity of the particular part, and upon determining that the driver is operating the device such as the smartphone, suggest performing safe driving.

In addition, Japanese Unexamined Patent Application Publication (JP-A) No. 2018-156539 discloses a warning apparatus configured to give a warning to a driver when it is determined that the driver is using a mobile device while a vehicle is traveling based on a heat distribution inside a vehicle compartment and a shift position. The heat distribution inside the vehicle compartment is measured by an infrared sensor. The shift position is detected by a shift sensor.

SUMMARY

An aspect of the disclosure provides a vehicle warning apparatus that includes a line-of-sight information acquisition unit, a movement information acquisition unit, a screen information acquisition unit, a warning level determination unit, and a warning unit. The line-of-sight information acquisition unit is configured to acquire line-of-sight information including a direction of a line of sight of a driver who drives a vehicle that is traveling. The movement information acquisition unit is configured to acquire movement information indicating a movement of a particular part of the driver. The screen information acquisition unit is configured to acquire screen information indicating a state of a screen of a mobile device. The warning level determination unit is configured to, while the vehicle is traveling, determine a state of the driver and a state of use of the mobile device by the driver based on the line-of-sight information, the movement information, and the screen information, and determine a warning level for the driver based on a result of determining the state of the driver and the state of the use of the mobile device by the driver. The warning unit is configured to give a warning based on the warning level. The warning is stronger as the warning level is higher. The warning level determination unit is configured to decrease the warning level when a function of the mobile device in use is an allowed function. The allowed function is a function use of which is allowed in advance.

An aspect of the disclosure provides a vehicle warning apparatus that includes circuitry. The circuitry is configured to acquire line-of-sight information, movement information, and screen information. The line-of-sight information includes a direction of a line of sight of a driver who drives a vehicle that is traveling. The movement information indicates a movement of a particular part of the driver. The screen information indicates a state of a screen of a mobile device. The circuitry is configured to, while the vehicle is traveling, determine a state of the driver and a state of use of the mobile device by the driver based on the line-of-sight information, the movement information, and the screen information, and determine a warning level for the driver based on a result of determining the state of the driver and the state of the use of the mobile device by the driver. The circuitry is configured to give a warning based on the warning level. The warning is stronger as the warning level is higher. The circuitry is configured to decrease the warning level when a function of the mobile device in use is an allowed function. The allowed function is a function use of which is allowed in advance.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is an explanatory diagram illustrating an example of a table related to a warning level determination for a case where a general function is in use, associating a state of a driver and a state of use of the mobile device by the driver with a warning level corresponding to those states, and stored in a storage of the vehicle warning apparatus according to one example embodiment of the disclosure.

FIG. 6 is an explanatory diagram illustrating an example of a table related to a warning level determination for a case where an allowed function is in use, associating the state of the driver and the state of the use of the mobile device by the driver with the warning level corresponding to those states, and stored in the storage of the vehicle warning apparatus according to one example embodiment of the disclosure.

FIG. 7 is an explanatory diagram illustrating an example of a table associating the warning level with a warning message corresponding to the warning level, and stored in the storage of the vehicle warning apparatus according to one example embodiment of the disclosure.

DETAILED DESCRIPTION

Figure 1:
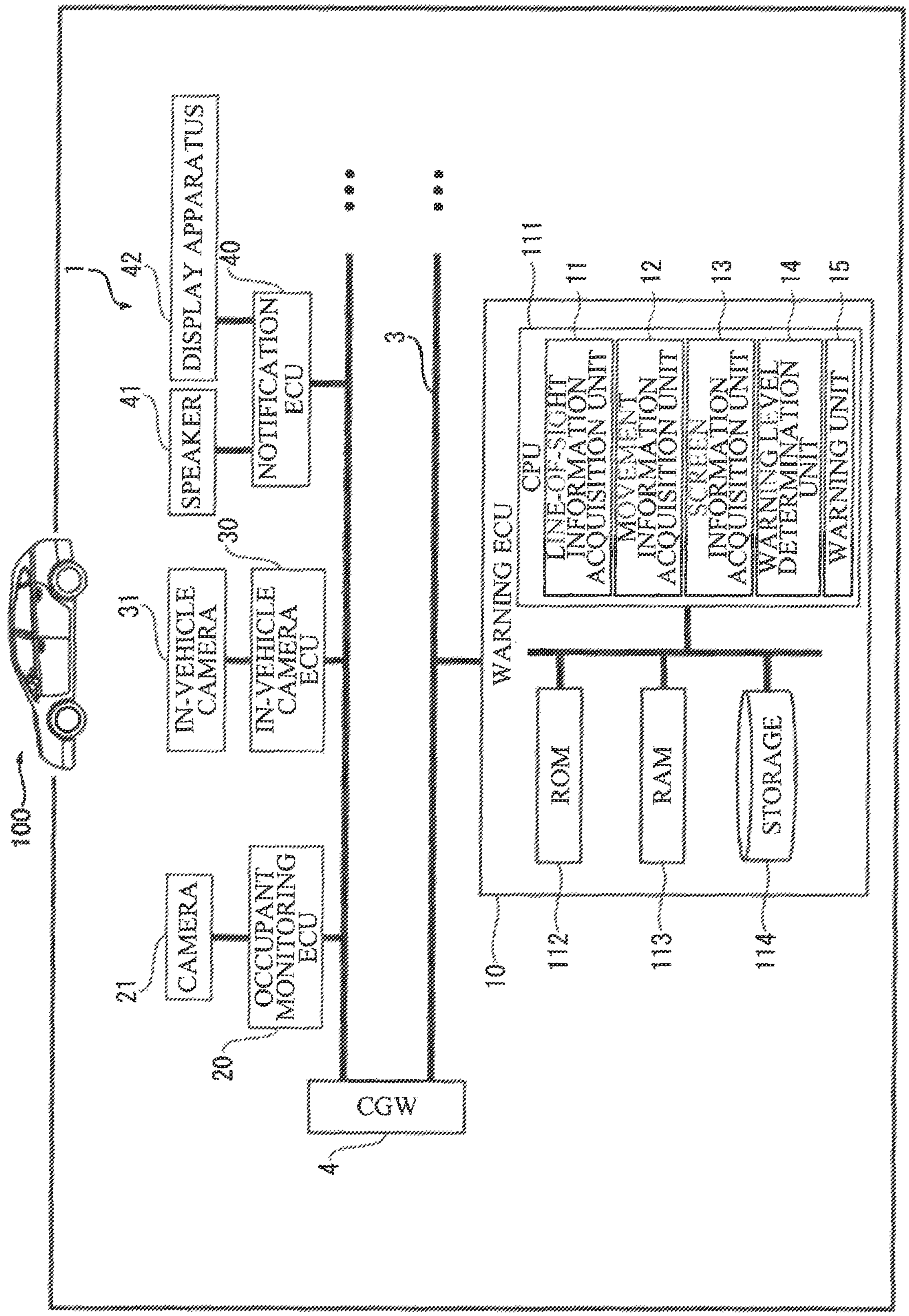
FIG. 1 is an explanatory diagram illustrating a schematic configuration of a vehicle control system including a vehicle warning apparatus according to one example embodiment of the disclosure.

Recently, an increasing number of drivers are acquiring information from mobile devices to use in driving. For example, such drivers use a navigation function of the mobile device to check a traveling route or a traveling time to a destination. Although operating the mobile device while a vehicle is traveling is to be strictly limited, an operation and use of particular functions may be allowed in some cases as long as safety is secured.

However, an information processing apparatus disclosed in JP-A No. 2017-111508, or a warning apparatus disclosed in JP-A No. 2018-156539 uniformly gives a warning when it is determined that a driver is operating a mobile device. Accordingly, in such an information processing apparatus or such a warning apparatus, an operation and use of the mobile device are totally forbidden in effect. Therefore, it is not allowed to use even a function for acquiring information to use in driving. This can lead to lack of user-friendliness in some cases.

It is desirable to achieve both safety and user-friendliness by calling attention in order to limit an operation on a mobile device by a driver while a vehicle is traveling and also easing limitation of an operation related to a particular function.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

As illustrated in FIG. 1, a vehicle warning apparatus according to an example embodiment of the disclosure may operate as a portion of a vehicle control system 1 and may be provided in a vehicle 100. The vehicle control system 1 may include various electronic devices to be used for traveling of the vehicle 100 and also include in-vehicle electronic control units (ECUs) that control the electronic devices. The electronic devices, the in-vehicle ECUs, and any other device or unit may be communicably coupled to each other via an in-vehicle network 3 such as a controller area network (CAN) or a local interconnect network (LIN). In addition, the electronic devices, the in-vehicle ECUs, and any other device or unit may be coupled to a central gateway (CGW) 4 to thereby operate as a portion of the vehicle control system 1. The CGW 4 may serve as a relay device.

Each of the in-vehicle ECUs may include, for example, a processor such as a central processing unit (CPU) or a micro processing unit (MPU), electric circuitry, and a storage device such as a random-access memory (RAM) or a read-only memory (ROM). The operation of the in-vehicle ECUs may be entirely or partially implemented by hardware such as an application specific integrated circuit (ASIC), a field-programmable gate array (FPGA), or a graphics processing unit (GPU).

In the following, a detailed description and illustration are omitted for some of the electronic devices, some of the in-vehicle ECUs, and any other device or unit that are not directly related to a warning ECU 10 or the vehicle warning apparatus according to the example embodiment.

As illustrated in FIG. 1, the vehicle control system 1 may include, as the in-vehicle ECUs, the warning ECU 10, an occupant monitoring ECU 20, an in-vehicle camera ECU 30, and a notification ECU 40. Each of the in-vehicle ECUs may be coupled to an electronic device to control, and may control an operation of the coupled electronic device based on information or data acquired from the in-vehicle network 3. In addition, each of the in-vehicle ECUs may supply, to the in-vehicle network 3, information regarding the operation of the electronic device acquired from the coupled electronic device.

That is, in the example embodiment, the warning ECU 10, the occupant monitoring ECU 20, the in-vehicle camera ECU 30, and the notification ECU 40 may perform mutual transmission and reception of information. The warning ECU 10 may monitor a state of a driver who drives the vehicle 100 and a state of use of a mobile device by the driver based on pieces of information received from the occupant monitoring ECU 20 and the in-vehicle camera ECU 30. The warning ECU 10 may transmit a control signal related to a warning based on a result of the monitoring to the notification ECU 40 to thereby give a warning to the driver. Details of the warning ECU 10 will be described later.

The occupant monitoring ECU 20 may be included in a driver monitoring system (DMS) that monitors an occupant present in the vehicle 100. The occupant monitoring ECU 20 may monitor the occupant by controlling an electronic device included in the DMS, such as a camera, a microphone, an illuminator illuminating the occupant, a seating sensor provided on a seat, or a door open and close sensor, any of which is not illustrated.

For example, the occupant monitoring ECU 20 may monitor a line of sight of the occupant based on an image captured by a camera 21. The occupant monitoring ECU 20 may supply, to the in-vehicle network 3, line-of-sight information as a result of the monitoring. For example, the occupant monitoring ECU 20 may calculate a direction of the line of sight of the occupant and position coordinates of a target object to which the line of sight is drawn, based on the image captured by the camera 21. The occupant monitoring ECU 20 may supply, to the in-vehicle network 3, the line-of-sight information including one or more of information regarding the direction of the line of sight, information regarding the calculated position coordinates, information regarding a shift in the position coordinates, and any other information.

The in-vehicle camera ECU 30 may be coupled to an in-vehicle camera 31. The in-vehicle camera ECU 30 may control the in-vehicle camera 31 to monitor a movement of a particular part of the driver, and to also monitor a state of the mobile device present at a driver's seat or around the driver's seat. Non-limiting examples of the particular part of the driver may include the driver's hand and the driver's finger. The in-vehicle camera 31 may be provided at a position that is on an upper side of the driver's seat and allows for capturing an image of the driver's seat and the driver. For example, the in-vehicle camera 31 may be provided on a ceiling, at a pillar, or any other location. The in-vehicle camera 31 may supply the captured image to the in-vehicle camera ECU 30. The in-vehicle camera ECU 30 may extract movement information and screen information based on the image captured by the in-vehicle camera 31. The movement information may indicate a movement of the particular part of the driver. The screen information may indicate a state of a screen of the mobile device.

More specifically, the in-vehicle camera ECU 30 may calculate position coordinates of the particular part of the driver such as the driver's hand or the driver's finger based on the image captured by the in-vehicle camera 31, and supply, to the in-vehicle network 3, a shift in the position coordinates as the movement information related to the particular part. In addition, the in-vehicle camera ECU 30 may supply at least the screen information including lighting information to the in-vehicle network 3, based on the image captured by the in-vehicle camera 31. The lighting information may indicate a lighting state of the screen of the mobile device. When a two-dimensional code to identify a function or an application in use is displayed on the screen of the mobile device, the in-vehicle camera ECU 30 may also include the two-dimensional code as function identification information in the screen information, and may supply the screen information to the in-vehicle network 3. Non-limiting examples of the two-dimensional code may include an icon and a QR code (registered trademark). Note that in one example, position coordinates of the screen of the mobile device and a shift in the position coordinates of the screen may be included in the screen information.

Figure 2:
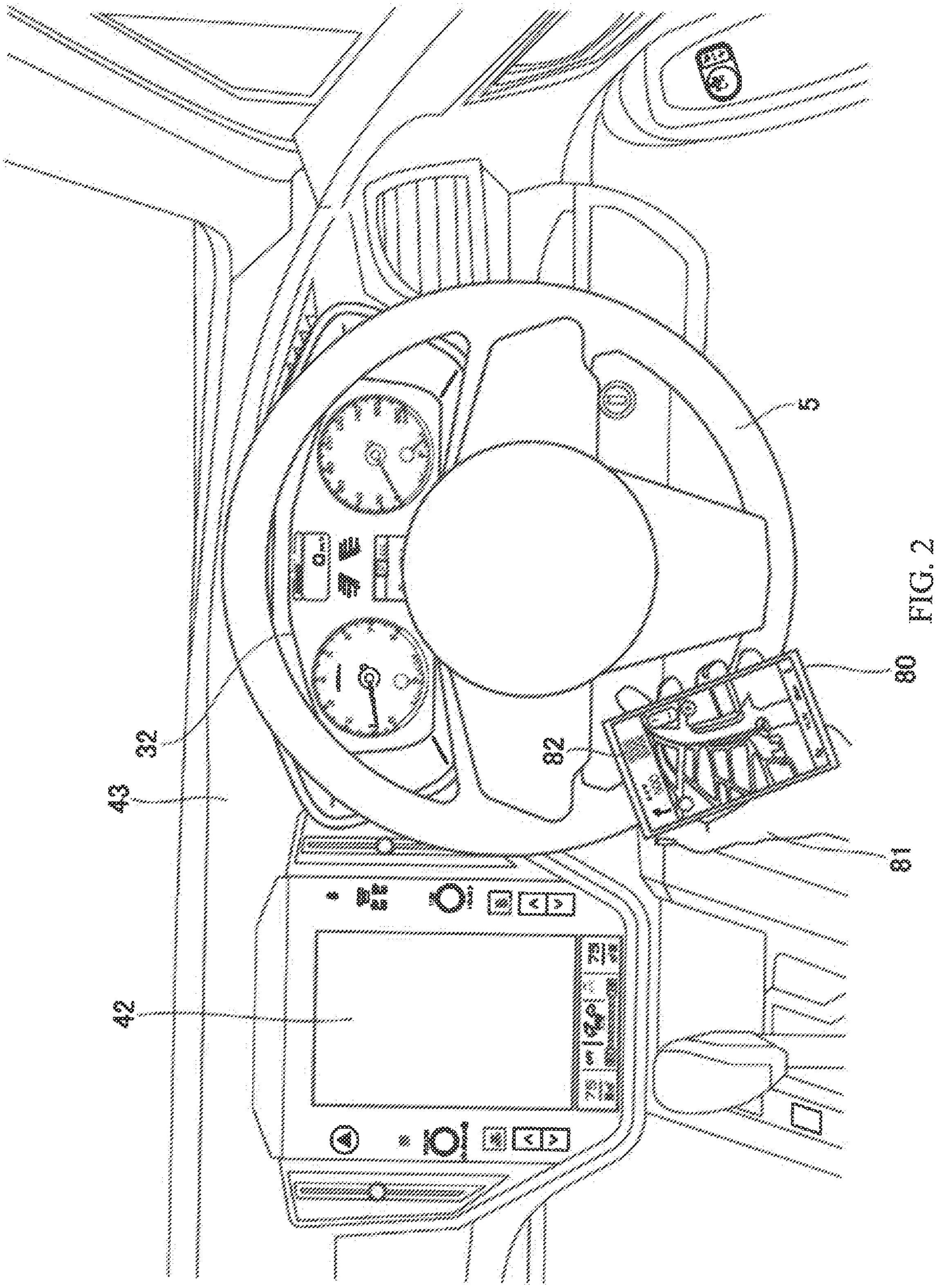
FIG. 2 is an explanatory diagram illustrating an example of a captured image of an inside of a vehicle compartment of a vehicle mounted with the vehicle warning apparatus according to one example embodiment of the disclosure.
Figure 3:
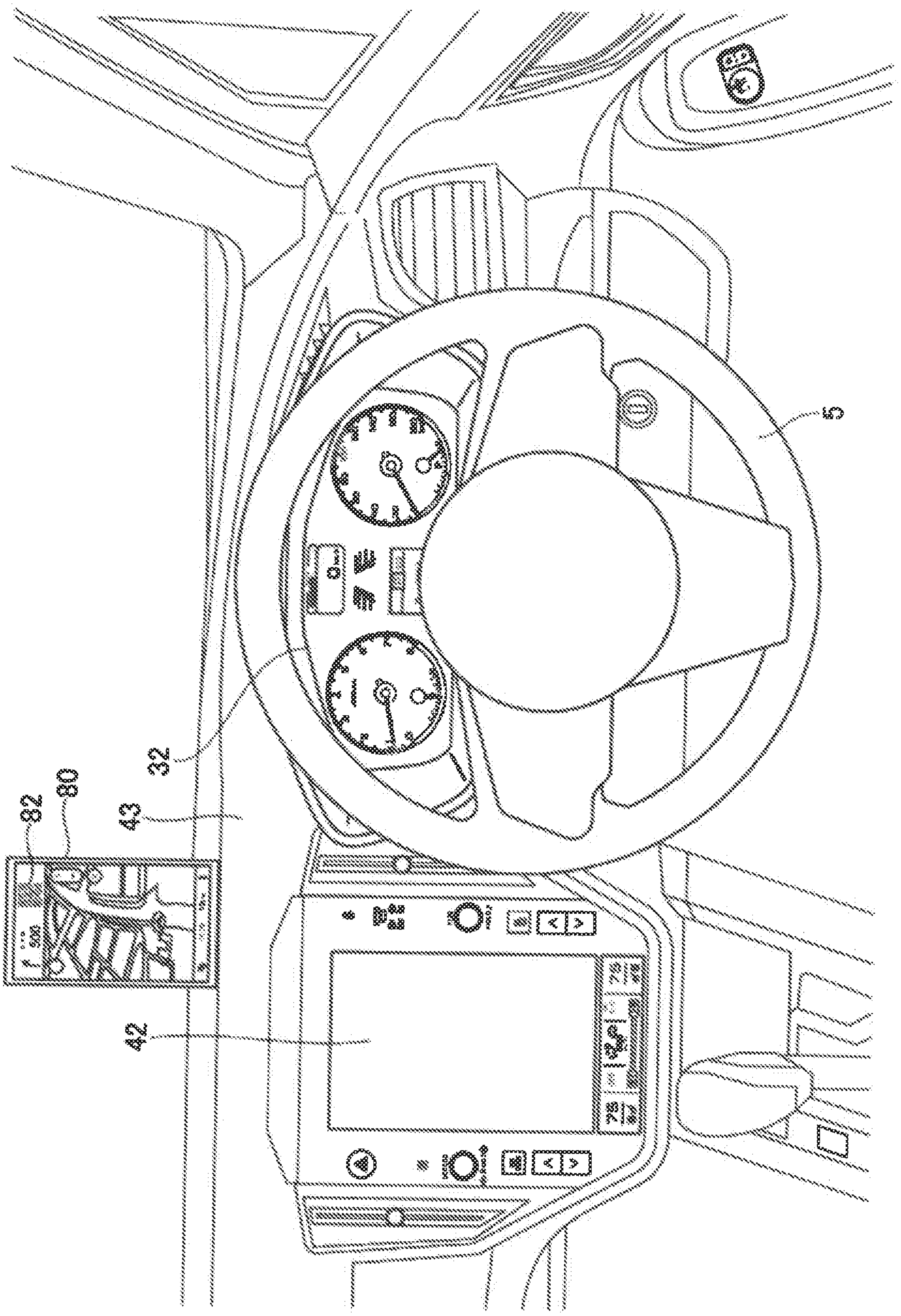
FIG. 3 is an explanatory diagram illustrating another example of the captured image of the inside of the vehicle compartment of the vehicle mounted with the vehicle warning apparatus according to one example embodiment of the disclosure.

FIGS. 2 and 3 each illustrate an example of an image to be captured by the in-vehicle camera 31.

Because the in-vehicle camera 31 captures an image of the driver's seat and the driver from the position on the upper side of the driver's seat, such as from the ceiling or the pillar, the in-vehicle camera 31 may capture an image including, in a field of view, for example but not limited to, a steering wheel 5, a meter 32 in front of the driver's seat, an in-vehicle apparatus such as a display apparatus 42, a dashboard 43, a particular part 81 of the driver, and a screen of a mobile device 80 held by the driver. Non-limiting examples of the particular part 81 of the driver may include the driver's hand and the driver's finger.

FIG. 2 illustrates an example of an image in which the driver is holding the mobile device 80 with the driver's hand 81. FIG. 3 illustrates an example of an image in which the mobile device 80 is fixed at a predetermined position on the dashboard 43. Acquiring such an image as a moving image or continuously acquiring such images as still images may make it possible to acquire the movement information related to the movement of the driver's hand or the driver's finger, the position coordinates indicating a position of the screen of the mobile device, and the shift in the position coordinates. In each of FIGS. 2 and 3, a QR code (registered trademark) 82 may be displayed on the screen of the mobile device 80. The QR code (registered trademark) 82 will be described later.

Figure 4:
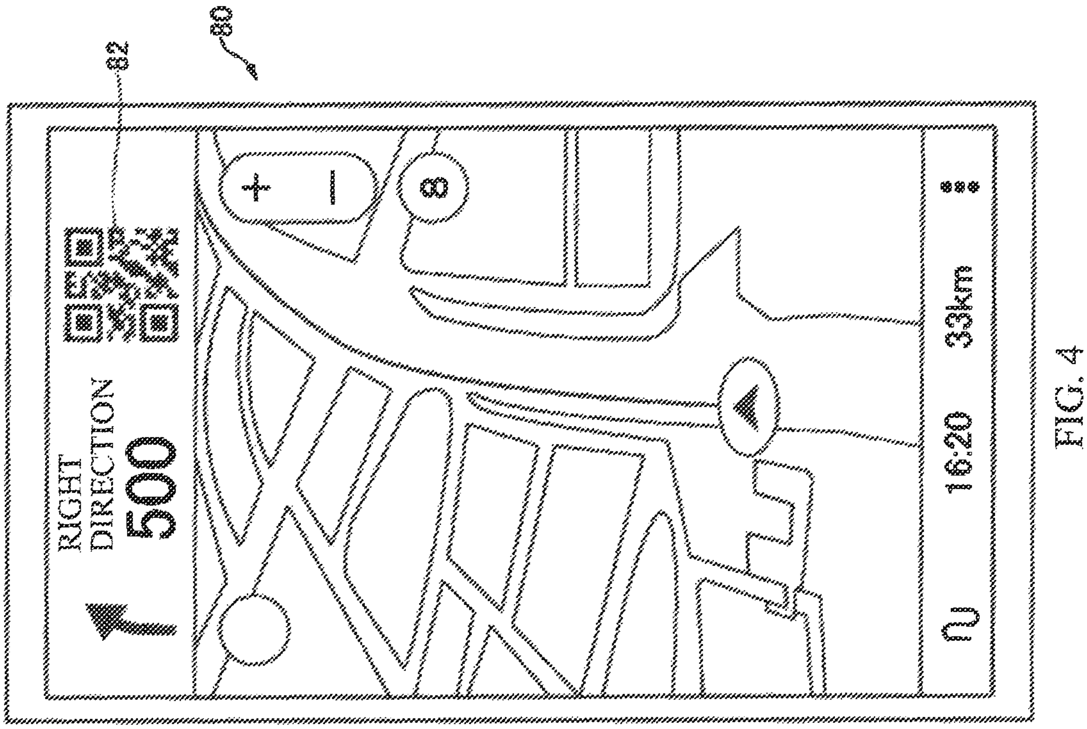
FIG. 4 is an explanatory diagram illustrating an example of a screen of a mobile device to be used inside the vehicle compartment of the vehicle mounted with the vehicle warning apparatus according to one example embodiment of the disclosure.

FIG. 4 illustrates an example of the screen of the mobile device 80. In the example illustrated in FIG. 4, a navigation function of the mobile device 80 may be in use. In the example illustrated in FIG. 4, the QR code (registered trademark) 82 as the function identification information may be displayed at an end of the screen. The function identification information may indicate that the navigation function is in use. When the acquired image includes such a QR code (registered trademark), the in-vehicle camera 31 may include the QR code (registered trademark) in the screen information as the function identification information. As the function identification information, needless to say that the QR code (registered trademark) may be displayed, a two-dimensional matrix or stacked code other than the QR code (registered trademark), an icon, a watermark, or any other information may be displayed on the screen of the mobile device 80.

The notification ECU 40 may be coupled to, for example but not limited to, a speaker 41 and the display apparatus 42. The notification ECU 40 may control any of the speaker 41 and the display apparatus 42 to give a warning based on a warning level to the driver of the vehicle 100 in accordance with a control signal received from the warning ECU 10.

The speaker 41 may be configured to output a warning message as a voice sound or to output a predetermined warning sound or any other sound in accordance with a notification instruction. The warning message may be set in association with the warning level. The warning message will be described later. The speaker 41 is not necessarily provided for notification or warning use, and may also serve as an in-vehicle audio apparatus or a speaker of a navigation system.

The display apparatus 42 may include, for example but not limited to, a display panel, a head-up display (HUD), and any other component, and may display an image viewable by the occupant. The display panel may be provided at the dashboard. The HUD may project an image onto a windshield. When the display apparatus 42 includes the HUD, the display apparatus 42 may be configured to display a message or an image based on the warning level on the windshield of the vehicle 100 to thereby give a warning to the occupant of the vehicle 100 such as the driver.

In addition to the above, the notification ECU 40 may be configured to control a device such as a seat vibrator or a steering-wheel vibrator to give a warning based on the warning level by vibration to the driver. The seat vibrator may vibrate a seat of the driver's seat on which the driver is to be seated. The steering-wheel vibrator may vibrate a steering wheel.

In the following, the warning ECU 10 will be described. In one embodiment, the warning ECU 10 may serve as a "vehicle warning apparatus". As illustrated in FIG. 1, the warning ECU 10 may include a central processing unit (CPU) 111, a ROM 112, a RAM 113, and a storage 114.

The CPU 111 may execute various processes based on a program stored in the ROM 112. In the example embodiment, the CPU 111 may read the program stored in the ROM 112, for example, to a memory such as the RAM 113 and execute the program. The CPU 111 may thus operate as a line-of-sight information acquisition unit 11, a movement information acquisition unit 12, a screen information acquisition unit 13, a warning level determination unit 14, and a warning unit 15 illustrated in FIG. 1.

The storage 114 may hold information to be used by the CPU 111 in operating as the line-of-sight information acquisition unit 11, the movement information acquisition unit 12, the screen information acquisition unit 13, the warning level determination unit 14, and the warning unit 15. In the following, a description is provided of the line-of-sight information acquisition unit 11, the movement information acquisition unit 12, the screen information acquisition unit 13, the warning level determination unit 14, and the warning unit 15.

The line-of-sight information acquisition unit 11 acquires the line-of-sight information including a direction of a line of sight of the driver. In the example embodiment, the line-of-sight information acquisition unit 11 may acquire the line-of-sight information from the occupant monitoring ECU 20 via the in-vehicle network 3. The line-of-sight information to be acquired may include one or more of information regarding the direction of the line of sight of the occupant, information regarding position coordinates of a target to which the line of sight is drawn, information regarding a shift in the position coordinates, and any other information. Acquiring the line-of-sight information may allow the warning level determination unit 14 to determine, for example but not limited to, whether the line of sight of the driver is directed to the front (whether the driver is not looking away), or whether the driver is staring at the screen of the mobile device. The warning level determination unit 14 will be described later.

The movement information acquisition unit 12 acquires the movement information indicating the movement of the particular part of the driver. In the example embodiment, the movement information acquisition unit 12 may acquire the movement information from the in-vehicle camera ECU 30 via the in-vehicle network 3. The movement information may include at least information regarding the position coordinates of the particular part of the driver such as the driver's hand or the driver's finger and information regarding a shift in the position coordinates. Acquiring the movement information may allow the warning level determination unit 14, which will be described later, to use the movement information together with the screen information to determine, for example, whether the driver's finger or the driver's hand is performing a movement assumable as an operation on the mobile device. Non-limiting examples of the movement assumable as the operation on the mobile device may include touching the screen of the mobile device. The warning level determination unit 14 may thus be able to determine the use state of the mobile device.

The screen information acquisition unit 13 acquires the image information indicating the state of the screen of the mobile device. In the example embodiment, the screen information acquisition unit 13 may acquire the image information from the in-vehicle camera ECU 30 via the in-vehicle network 3. The screen information may include at least the lighting information indicating the lighting state of the screen of the mobile device. When an icon or a two-dimensional code such as a QR code (registered trademark) identifying a function or an application in use is displayed on the screen of the mobile device, the screen information may also include such function identification information. In addition, the position coordinates of the screen of the mobile device and the shift in the position coordinates may also be included in the screen information.

The lighting information related to the screen of the mobile device may include, for example, pieces of information different in brightness level of the screen. Non-limiting examples of the pieces of information different in brightness level of the screen may include information regarding a brightly lit state and information regarding a dimly lit state. The brightness level may depend on the kind of the mobile device or a setting of the mobile device. Typically, however, the screen may be in the brightly lit state when the mobile device is continuously operated. If no operation is performed for a certain time, the lighting state may shift to the dimly lit state, and may thereafter shift to an unlit state.

For example, when the screen of the mobile device is in the brightly lit state, the line of sight of the occupant may be easily drawn to the screen of the mobile device. For example, when the screen of the mobile device is in the brightly lit state upon night driving, a dangerous situation may occur. The dangerous situation may be, for example, a situation in which a difference in luminance temporarily makes it difficult to see a dark place in the front. To address the above, including such information indicating the brightness level in the lighting information may provide useful information when the warning level determination unit 14 to be described later determines the use state of the mobile device or the warning level.

Whether the lighting state is the brightly lit state or the dimly lit state may be determined based on a threshold of the luminance of the screen of the mobile device. The luminance of the screen may vary depending on a lighting color of the screen. For example, when comparing a screen in black with a backlight being lit at the maximum luminance in the mobile device and a screen in white with the backlight being lit at a low luminance, the screen in white may be felt brighter. In such a manner, the brightness level of the displayed screen may vary depending on a color displayed on the screen. For such a reason, the threshold of the luminance described above may be changed in accordance with the displayed color.

When the driver uses the mobile device while the vehicle is traveling, the driver may stare at or operate the screen of the mobile device and thus pay less attention to the front. This can lead to a vehicle accident. Therefore, if the driver is using the mobile device while the vehicle is traveling, a warning may be given to the driver or attention calling may be performed for the driver. For such a reason, the screen information acquisition unit 13 may acquire the screen information including the lighting information indicating the lighting state of the screen of the mobile device as one information to determine the state of the use of the mobile device by the driver.

However, in some cases, the driver may acquire information to be used in driving from the mobile device. For example, the driver may use the navigation function provided of the mobile device to check a traveling route or a traveling time to a destination. When a particular function such as the navigation function is used and safety is secured, the use of the mobile device may be allowed to some extent in some cases rather than giving a warning in a manner similar to that for other functions. Including the function identification information in the screen information may allow the warning level determination unit 14 to be described later to determine whether the function of the mobile device in use is an allowed function. The allowed function may be a function the use of which is allowed in advance.

In one example, the movement information acquisition unit 12 may acquire the image captured by the in-vehicle camera 31 from the in-vehicle camera ECU 30, and may calculate and acquire the movement information from the acquired image. In one example, the screen information acquisition unit 13 may acquire the image captured by the in-vehicle camera 31 from the in-vehicle camera ECU 30, and may calculate and acquire the screen information from the acquired image.

The warning level determination unit 14 determines the state of the driver and the state of the use of the mobile device by the driver based on the line-of-sight information, the movement information, and the screen information. The warning level determination unit 14 determines the warning level for the driver based on a result of determining the state of the driver and the state of the use of the mobile device by the driver. The warning level determination unit 14 may also acquire control information or vehicle speed information, and may use the acquired control information or the acquired vehicle speed information in determining the warning level. The control information may indicate whether the vehicle 100 is traveling under a control in an advanced driving assistance mode. A warning level determination process to be performed by the warning level determination unit 14 will be described later.

The warning unit 15 may give a warning based on the warning level determined by the warning level determination unit 14. For example, the warning unit 15 may supply a control signal regarding the warning based on the warning level to the notification ECU 40 via the in-vehicle network 3 and may give a warning to the driver via the notification ECU 40. Non-limiting examples of the warning to be given by the warning unit 15 may include an audio output of a warning message, a display of a warning message, and an output of a warning sound.

The storage 114 may hold pieces of information received from the line-of-sight information acquisition unit 11, the movement information acquisition unit 12, and the screen information acquisition unit 13. The storage 114 may also hold a table. Non-limiting examples of the table may include a table associating the state of the driver and the state of the use of the mobile device by the driver with the warning level corresponding to those states as illustrated in FIGS. 5 and 6; and a table associating the warning level with the warning message corresponding to the warning level as illustrated in FIG. 7.

In the following, a warning process to be performed by the warning ECU 10 having the above-described configuration will be described referring to flowcharts illustrated in FIGS. 8 to 11. The description given below refers to a case where the navigation function of the mobile device as the allowed function is in use.

Figure 8:
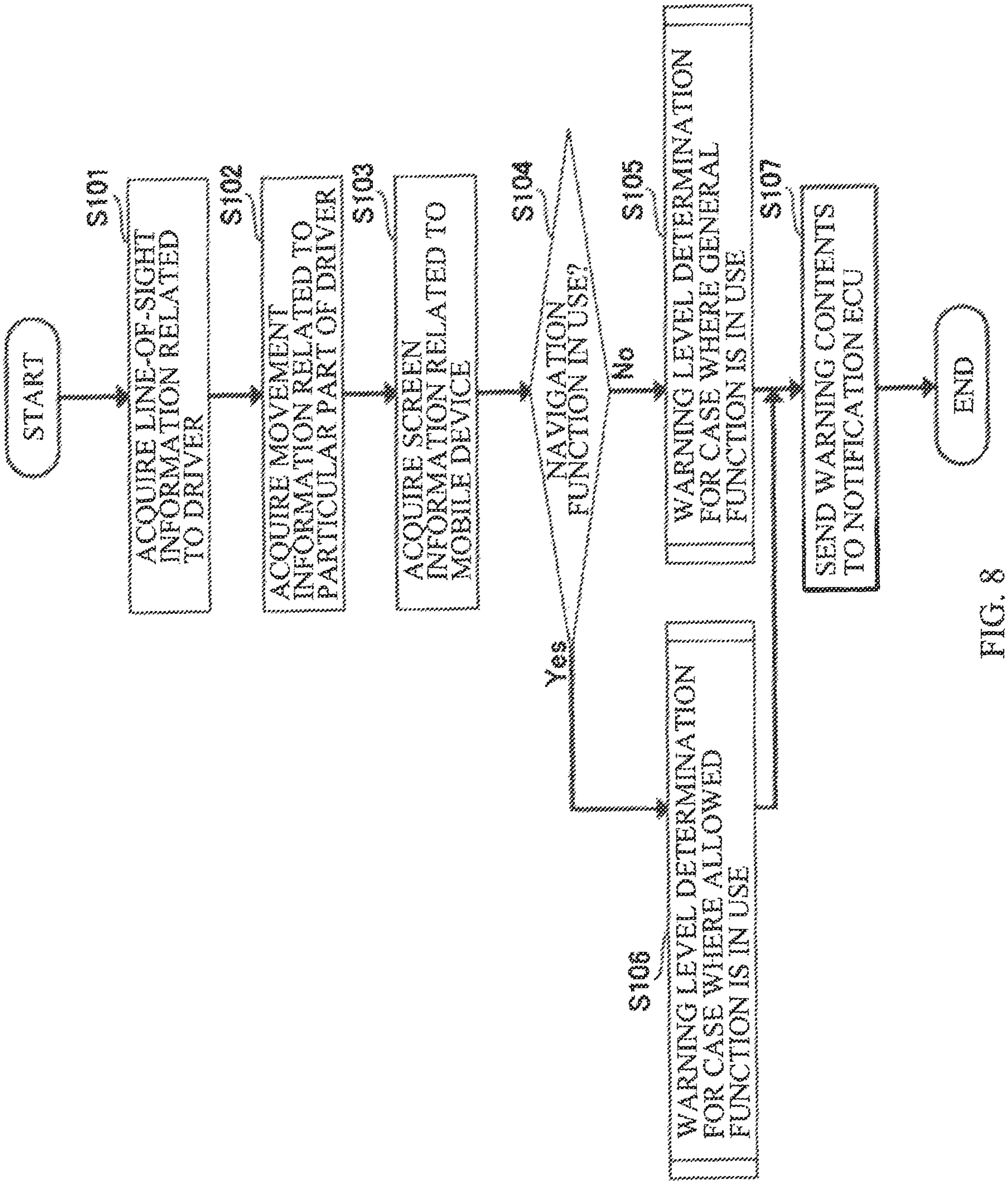
FIG. 8 is a flowchart illustrating a flow of a warning process to be performed in the vehicle warning apparatus according to one example embodiment of the disclosure.

FIG. 8 is a flowchart illustrating a flow of the warning process to be performed by the warning ECU 10.

In the warning ECU 10, the line-of-sight information acquisition unit 11 may acquire the line-of-sight information related to the driver (step S101). The movement information acquisition unit 12 may acquire the movement information related to the movement of any of the driver's hand and the driver's finger (step S102). The screen information acquisition unit 13 may acquire the screen information related to the mobile device (step S103). The line-of-sight information acquisition unit 11, the movement information acquisition unit 12, and the screen information acquisition unit 13 may output the acquired line-of-sight information, the acquired movement information, and the acquired screen information to the warning level determination unit 14, respectively.

The warning level determination unit 14 may determine whether the function of the mobile device in use is the navigation function based on the function identification information included in the screen information (step S104). If the warning level determination unit 14 determines that the function of the mobile device in use is not the navigation function, that is, not the allowed function, based on the function identification information (step S104: No), the warning level determination unit 14 may determine that a function other than the allowed function is in use, and may perform a warning level determination process for a case where a general function is in use (step S105).

If the warning level determination unit 14 determines that the function of the mobile device in use is the navigation function (step S104: Yes), the warning level determination unit 14 may perform a warning level determination process for a case where the allowed function is in use (step S106). When the warning level is determined through the warning level determination process (step S105 or step S106), the warning unit 15 may output a control signal regarding a warning corresponding to the determined warning level to the notification ECU 40, and may thereby give a warning to the driver (step S107).

[Warning Level Determination Process to be Performed by Warning Level Determination Uni 14]

The warning level determination process in the warning ECU 10 may differ depending on the function of the mobile device in use. When a function other than the allowed function of the mobile device is in use, the warning level determination process for the case where the general function is in use (step S105 in FIG. 8) may be performed. The allowed function may be a function the use of which is allowed. When the allowed function is in use, the warning level determination process for the case where the allowed function is in use (step S106 in FIG. 8) may be performed.

[(1) Warning Level Determination Process for Case where General Function is in Use]

Figure 9:
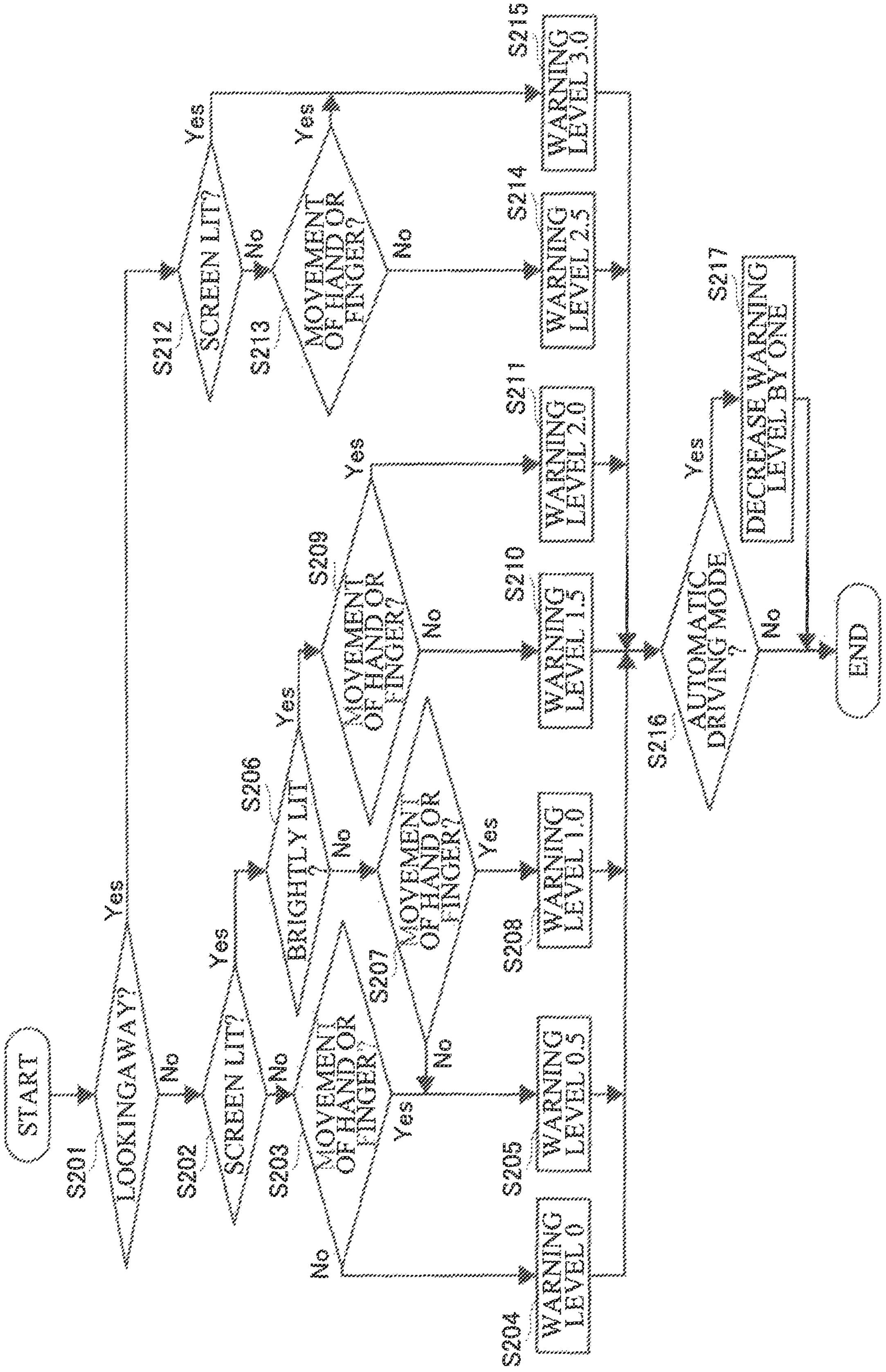
FIG. 9 is a flowchart illustrating a flow of a warning level determination process for the case where the general function is in use, to be performed in the vehicle warning apparatus according to one example embodiment of the disclosure.

The warning level determination process for the case where the general function is in use may be performed by the warning level determination unit 14 in accordance with the flowchart illustrated in FIG. 9. For example, as illustrated in FIG. 5, the warning level may be determined based on the state of the driver and the state of the use of the mobile device by the driver. The following may be a non-limiting example of the warning level determination process for the case where the general function is in use.

First, the warning level determination unit 14 may determine whether the driver is looking away based on the line-of-sight information (step S201).

If the driver is looking away (step S201: Yes) and the screen of the mobile device is lit (step S212: Yes), the warning level determination unit 14 may set the warning level to 3.0 regardless of the brightness level of the lighting state (step S215).

If the driver is looking away (step S201: Yes), and the screen of the mobile device is not lit (step S201: Yes, step S212: No), but any of the driver's hand and the driver's finger is performing the movement assumable as the operation on the mobile device (step S213: Yes), the warning level determination unit 14 may set the warning level to 3.0 (step S215). If any of the driver's hand and the driver's finger is not performing the movement assumable as the operation on the mobile device (step S213: No), the warning level determination unit 14 may set the warning level to 2.5 (step S214).

If the driver is not looking away (step S201: No), and the screen of the mobile device is lit (step S202: Yes), the warning level determination unit 14 may determine whether the lighting state is the darkly lit state or the brightly lit state (step S206).

When the screen of the mobile device is in the brightly lit state (step S206: Yes), if any of the driver's hand and the driver's finger is performing the movement assumable as the operation on the mobile device (step S209: Yes), the warning level determination unit 14 may set the warning level to 2.0 (step S211). If any of the driver's hand and the driver's finger is not performing the movement assumable as the operation on the mobile device (step S209: No), the warning level determination unit 14 may set the warning level to 1.5 (step S210).

When the screen of the mobile device is not in the brightly lit state, in other words, when the screen of the mobile device is in the dimly lit state (step S206: No), if any of the driver's hand and the driver's finger is performing the movement assumable as the operation on the mobile device (step S207: Yes), the warning level determination unit 14 may set the warning level to 1.0 (step S208). If any of the driver's hand and the driver's finger is not performing the movement assumable as the operation on the mobile device (step S207: No), the warning level determination unit 14 may set the warning level to 0.5 (step S205).

When the driver is not looking away (step S201: No) and the screen of the mobile device is not lit (step S202: No), the warning level determination unit 14 may determine whether any of the driver's hand and the driver's finger is performing the movement assumable as the operation on the mobile device (step S203).

If any of the driver's hand and the driver's finger is performing the movement assumable as the operation on the mobile device (step S203: Yes), the warning level determination unit 14 may set the warning level to 0.5 (step S205). If any of the driver's hand or the driver's finger is not performing the movement assumable as the operation on the mobile device (step S203: No), the warning level determination unit 14 may set the warning level to 0 (step S204).

If the vehicle 100 is traveling in the advanced driving assistance mode (step S216: Yes), the warning level determination unit 14 may decrease the warning level. That is, the warning level determination unit 14 may determine a final determination result to be a warning level decreased by one level from the warning level determined in steps S201 to S215 (step S217). If the vehicle 100 is traveling based on manual driving (step S216: No), the warning level determination unit 14 may determine the final determination result to be the warning level determined in steps S201 to S215. Note that when the warning level determination unit 14 has acquired the vehicle speed information indicating the traveling speed of the vehicle 100, the warning level determination unit 14 may cause the vehicle speed information to be reflected in the final determination result. For example, the warning level determination unit 14 may increase the warning level with an increase in vehicle speed, based on the vehicle speed information. In one embodiment, the vehicle speed information may serve as "speed information".

[(2) Warning Level Determination Process for Case where Allowed Function is in Use]

Figure 10:
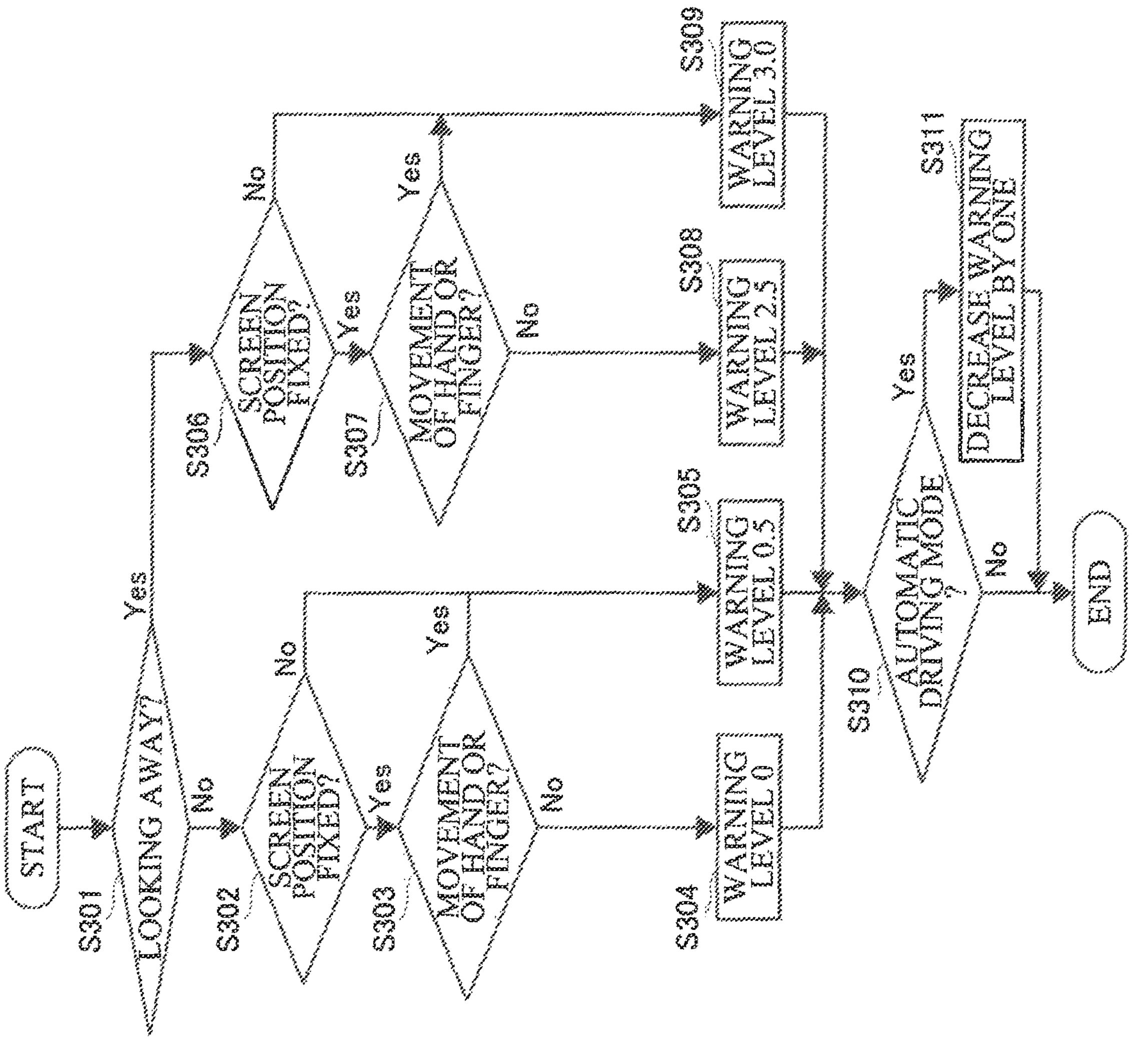
FIG. 10 is a flowchart illustrating a flow of a warning level determination process for the case where the allowed function is in use, to be performed in the vehicle warning apparatus according to one example embodiment of the disclosure.

The warning level determination process for the case where the allowed function is in use may be performed by the warning level determination unit 14 in accordance with the flowchart illustrated in FIG. 10. For example, as illustrated in FIG. 6, the warning level may be determined based on the state of the driver and the state of the use of the mobile device by the driver. The following may be a non-limiting example of the warning level determination process for the case where the allowed function is in use.

First, the warning level determination unit 14 may determine whether the driver is looking away based on the line-of-sight information (step S301).

If the driver is not looking away (step S301: No) and the position of the screen of the mobile device is fixed (step S302: Yes), the warning level determination unit 14 may determine whether any of the driver's hand and the driver's finger is performing the movement assumable as the operation on the mobile device (step S303). Note that the determination in step S302 may be performed based on whether there is a shift in position coordinates representing the position of the screen of the mobile device. For example, when the mobile device is disposed at a position fixed on the dashboard as illustrated in FIG. 3, the position of the screen of the mobile device may be determined as being fixed.

When the driver is not looking away (step S301: No) and the position of the screen of the mobile device is fixed (step S302: Yes), if any of the driver's hand and the driver's finger is not performing the movement assumable as the operation on the mobile device (step S303: No), the warning level determination unit 14 may set the warning level to 0 (step S304). If any of the driver's hand and the driver's finger is performing the movement assumable as the operation on the mobile device (step S303: Yes), the warning level determination unit 14 may set the warning level to 0.5 (step S305).

When the driver is not looking away (step S301: No) and the position of the screen of the mobile device is not fixed (step S302: No), the warning level determination unit 14 may set the warning level to 0.5 regardless of whether any of the driver's hand and the driver's finger is performing the movement assumable as the operation on the mobile device (step S305). Note that when the position of the screen of the mobile device is not fixed, it may be assumed that the driver is holding the mobile device with his or her hand. For this reason, in such a case, the warning level determination unit 14 may uniformly set the warning level to the highest level regardless of the movements of the line of sight, the hand, and the finger of the driver.

When the driver is looking away (step S301: Yes) and the position of the screen of the mobile device is fixed (step S306: Yes), the warning level determination unit 14 may determine whether any of the driver's hand and the driver's finger is performing the movement assumable as the operation on the mobile device (step S307).

When the driver is looking away (step S301: Yes) and the position of the screen of the mobile device is fixed (step S306: Yes), if any of the driver's hand and the driver's finger is not performing the movement assumable as the operation on the mobile device (step S307: No), the warning level determination unit 14 may set the warning level to 2.5 (step S308). If any of the driver's hand and the driver's finger is performing the movement assumable as the operation on the mobile device (step S307: Yes), the warning level determination unit 14 may set the warning level to 3.0 (step S309).

When the driver is looking away (step S301: Yes) and the position of the screen of the mobile device is not fixed (step S306: No), the warning level determination unit 14 may set the warning level to 3.0 regardless of whether any of the driver's hand and the driver's finger is performing the movement assumable as the operation on the mobile device (step S309).

If the vehicle 100 is traveling in the advanced driving assistance mode (step S310: Yes), the warning level determination unit 14 may decrease the warning level. That is, the warning level determination unit 14 may determine a final determination result to be a warning level decreased by one level from the warning level determined in steps S301 to S309 (step S311). If the vehicle 100 is traveling based on manual driving (step S310: No), the warning level determination unit 14 may determine the final determination result to be the warning level determined in steps S301 to S309.

Note that the warning level determination unit 14 may be configured to acquire the vehicle speed information indicating the traveling speed of the vehicle 100 from an unillustrated vehicle speed sensor. In this case, the warning level determination unit 14 may cause the vehicle speed information to be reflected in the final determination result. For example, the warning level determination unit 14 may increase the warning level with an increase in the vehicle speed. In one embodiment, the vehicle speed information may serve as the "speed information".

As described above, when the function of the mobile device in use is the allowed function the use of which is allowed in advance, the warning level determination unit 14 may perform a process different from the warning level determination process for the case where the general function is in use. When a predetermined condition is satisfied, the warning level determination unit 14 may select a warning level lower than that in the case where the general function is in use. That is, when the general function of the mobile device other than the allowed function is in use while the vehicle is traveling, attention may be called in order to limit the use of the general function of the mobile device. Regarding the use of a particular allowed function, the limitation may be eased to allow the use of the allowed function when the predetermined condition is satisfied. This makes it possible to achieve both safety and user-friendliness.

Mounting the vehicle control system 1 including such a vehicle warning apparatus (a warning ECU) on the vehicle 100 as illustrated in FIG. 1 makes it possible, in the vehicle 100, to ease the limitation in use of the predetermined allowed function such as the navigation function while appropriately giving a warning or appropriately calling attention regarding the use of the mobile device by the driver while the vehicle is traveling. It is therefore possible to achieve both safety and user-friendliness.

Note that although in the above-described example embodiment, the state of the driver and the state of the use of the mobile device by the driver may be determined based on various pieces of information including, without limitation, information acquired by occupant monitoring ECU 20 using the image captured by the camera 21 and information acquired by the in-vehicle camera ECU 30 using the image captured by the in-vehicle camera 31, this is non-limiting. For example, a 360-degree camera that is configured to capture a 360-degree image may be mounted inside the vehicle, and the various pieces of information may be acquired from an image captured by the 360-degree camera.

As described above, according to the vehicle warning apparatus of the example embodiment, it is possible to ease the limitation regarding the operation related to a particular function while calling attention in order to limit the operation of the mobile device by the driver when the vehicle is traveling. It is therefore possible to achieve both safety and user-friendliness.

Although some example embodiments of the disclosure have been described in the foregoing by way of example with reference to the accompanying drawings, the detailed configuration is by no means limited to those in the embodiments described above. It should be appreciated that modifications and alterations may be made by persons skilled in the art without departing from the scope as defined by the appended claims. The example embodiments described above may also be combined with each other to use a technique in one example embodiment in another as long as its purpose, configuration, etc. do not involve any inconsistency or any inconvenience. The disclosure is intended to include such modifications and alterations in so far as they fall within the scope of the appended claims or the equivalents thereof.

Each of the CPU 111, the line-of-sight information acquisition unit 11, the movement information acquisition unit 12, the screen information acquisition unit 13, the warning level determination unit 14, and the warning unit 15 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 111, the line-of-sight information acquisition unit 11, the movement information acquisition unit 12, the screen information acquisition unit 13, the warning level determination unit 14, and the warning unit 15 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the CPU 111, the line-of-sight information acquisition unit 11, the movement information acquisition unit 12, the screen information acquisition unit 13, the warning level determination unit 14, and the warning unit 15 illustrated in FIG. 1.

The invention claimed is:

1. A vehicle warning apparatus comprising:

a line-of-sight information acquisition unit configured to acquire line-of-sight information comprising a direction of a line of sight of a driver who drives a vehicle that is traveling;

a movement information acquisition unit configured to acquire movement information indicating a movement of a particular part of the driver;

a screen information acquisition unit configured to acquire screen information indicating a state of a screen of a mobile device;

a warning level determination unit configured to, while the vehicle is traveling, determine a state of the driver and a state of use of the mobile device by the driver based on the line-of-sight information, the movement information, and the screen information, and determine a warning level for the driver based on a result of determining the state of the driver and the state of the use of the mobile device by the driver; and a warning unit configured to give a warning based on the warning level, the warning being stronger as the warning level is higher, wherein the warning level determination unit is configured to decrease the warning level when a function of the mobile device in use is an allowed function on the mobile device only when a predetermined condition is satisfied, the predetermined condition comprising at least one of: (i) the allowed function being a navigation function and the screen of the mobile device being at a fixed position, or (ii) the vehicle traveling in an advanced driving assistance mode, the warning level determination unit being further configured to ease a limitation of the allowed function when the predetermined condition is satisfied, the allowed function being a function use of which is allowed in advance for the mobile device within the vehicle.

2. The vehicle warning apparatus according to claim 1, wherein the warning level determination unit is configured to determine whether the function of the mobile device in use is the allowed function based on the screen information.

3. The vehicle warning apparatus according to claim 1, wherein the allowed function comprises a navigation function.

4. The vehicle warning apparatus according to claim 2, wherein the allowed function comprises a navigation function.

5. The vehicle warning apparatus according to claim 1, wherein the screen information comprises lighting information and function identification information, the lighting information indicating a lighting state of the screen of the mobile device, the function identification information being to be displayed on the screen while the allowed function is in use.

6. The vehicle warning apparatus according to claim 2, wherein the screen information comprises lighting information and function identification information, the lighting information indicating a lighting state of the screen of the mobile device, the function identification information being to be displayed on the screen while the allowed function is in use.

7. The vehicle warning apparatus according to claim 5, wherein the function identification information comprises an icon or a two-dimensional code.

8. The vehicle warning apparatus according to claim 6, wherein the function identification information comprises an icon or a two-dimensional code.

9. The vehicle warning apparatus according to claim 1, wherein the warning level determination unit is configured to decrease the warning level when the vehicle is traveling in an advanced driving assistance mode.

10. The vehicle warning apparatus according to claim 2, wherein the warning level determination unit is configured to decrease the warning level when the vehicle is traveling in an advanced driving assistance mode.

11. The vehicle warning apparatus according to claim 1, wherein the warning level determination unit is configured to acquire speed information indicating a traveling speed of the vehicle, and increase the warning level with an increase in the traveling speed.

12. The vehicle warning apparatus according to claim 2, wherein the warning level determination unit is configured to acquire speed information indicating a traveling speed of the vehicle, and increase the warning level with an increase in the traveling speed.

13. A vehicle warning apparatus comprising circuitry configured to acquire line-of-sight information, movement information, and screen information, the line-of-sight information comprising a direction of a line of sight of a driver who drives a vehicle that is traveling, the movement information indicating a movement of a particular part of the driver, the screen information indicating a state of a screen of a mobile device, while the vehicle is traveling, determine a state of the driver and a state of use of the mobile device by the driver based on the line-of-sight information, the movement information, and the screen information, and determine a warning level for the driver based on a result of determining the state of the driver and the state of the use of the mobile device by the driver, give a warning based on the warning level, the warning being stronger as the warning level is higher, and decrease the warning level when a function of the mobile device in use is an allowed function on the mobile device only when a predetermined condition is satisfied, the predetermined condition comprising at least one of: (i) the allowed function being a navigation function and the screen of the mobile device being at a fixed position, or (ii) the vehicle traveling in an advanced driving assistance mode, the warning level determination unit being further configured to ease a limitation of the allowed function when the predetermined condition is satisfied, the allowed function being a function use of which is allowed in advance for the mobile device within the vehicle.

14. A method stored in a non-transitory computer readable medium, comprising:

acquiring line-of-sight information comprising a direction of a line of sight of a driver who drives a vehicle that is traveling;

acquiring movement information indicating a movement of a particular part of the driver;

acquiring screen information indicating a state of a screen of a mobile device;

while the vehicle is traveling, determining a state of the driver and a state of use of the mobile device by the driver based on the line-of-sight information, the movement information, and the screen information, and determine a warning level for the driver based on a result of determining the state of the driver and the state of the use of the mobile device by the driver;

providing a warning based on the warning level, the warning being stronger as the warning level is higher; and decreasing the warning level when a function of the mobile device in use is an allowed function on the mobile device only when a predetermined condition is satisfied, the predetermined condition comprising at least one of: (i) the allowed function being a navigation function and the screen of the mobile device being at a fixed position, or (ii) the vehicle traveling in an advanced driving assistance mode, the warning level determination unit being further configured to ease a limitation of the allowed function when the predetermined condition is satisfied, the allowed function being a function use of which is allowed in advance for the mobile device within the vehicle.

15. The method according to claim 14, further comprising determining whether the function of the mobile device in use is the allowed function based on the screen information.

16. The method according to claim 14, wherein the allowed function comprises a navigation function.

17. The method according to claim 14, wherein the screen information comprises lighting information and function identification information, the lighting information indicating a lighting state of the screen of the mobile device, the function identification information being to be displayed on the screen while the allowed function is in use.

18. The method according to claim 14, wherein the screen information comprises lighting information and function identification information, the lighting information indicating a lighting state of the screen of the mobile device, the function identification information being to be displayed on the screen while the allowed function is in use.

19. The method according to claim 14, wherein the function identification information comprises an icon or a two-dimensional code, wherein the warning level determination unit is configured to decrease the warning level when the vehicle is traveling in an advanced driving assistance mode.

20. The method according to claim 14, wherein the warning level determination unit is configured to acquire speed information indicating a traveling speed of the vehicle, and increase the warning level with an increase in the traveling speed.

* * * * *